(12) United States Patent
Arnold

(10) Patent No.: US 7,044,085 B2
(45) Date of Patent: May 16, 2006

(54) NUISANCE ANIMAL CONTROLLER

(76) Inventor: Ralph Edward Arnold, 710 Broadway St., Superior, WI (US) 54880

(*) Notice: Subject to any disclaimer, the term of this patent is extended or adjusted under 35 U.S.C. 154(b) by 0 days.

(21) Appl. No.: 10/810,509

(22) Filed: Mar. 29, 2004

(65) Prior Publication Data

US 2005/0211186 A1    Sep. 29, 2005

Related U.S. Application Data

(60) Provisional application No. 60/459,702, filed on Apr. 3, 2003.

(51) Int. Cl.
*A01K 37/00* (2006.01)
(52) U.S. Cl. .................. 119/712; 119/719; 340/573.2; 340/573.3; 361/232
(58) Field of Classification Search ............... 119/712, 119/719, 720, 721, 52.3, 52.4, 57.9; 340/573.1, 340/573.3, 573.2; 361/232
See application file for complete search history.

(56) References Cited

U.S. PATENT DOCUMENTS

| | | | |
|---|---|---|---|
| 922,377 A * | 5/1909 | Ames | 43/98 |
| 1,541,985 A * | 6/1925 | Marquis | 43/98 |
| 2,191,127 A * | 2/1940 | Hazel | 43/98 |
| 2,891,508 A * | 6/1959 | Bower | 119/52.3 |
| 3,480,176 A * | 11/1969 | Boyd | 220/730 |
| 3,827,176 A * | 8/1974 | Stirewalt | 43/98 |
| 4,274,123 A * | 6/1981 | Rogers, Jr. | 361/232 |
| 5,095,646 A * | 3/1992 | Bunkers | 43/98 |
| 5,269,091 A * | 12/1993 | Johnson et al. | 43/98 |
| 5,392,732 A * | 2/1995 | Fry | 119/57.9 |
| 5,834,686 A * | 11/1998 | Barrett et al. | 174/5 R |
| 5,864,292 A * | 1/1999 | Roestenberg et al. | 340/573.2 |
| 5,894,818 A * | 4/1999 | Betzen | 119/712 |
| 6,125,595 A * | 10/2000 | Showalter | 52/101 |
| 6,378,459 B1 * | 4/2002 | Potente | 119/57.9 |
| 6,401,658 B1 * | 6/2002 | Teets | 119/57.9 |
| 6,519,131 B1 * | 2/2003 | Beck | 361/232 |
| 6,561,128 B1 * | 5/2003 | Carter | 119/57.9 |
| 2005/0120975 A1 * | 6/2005 | Kondo | 119/713 |

* cited by examiner

*Primary Examiner*—Yvonne R. Abbott

(57) ABSTRACT

This invention is a device that utilizes a specialized shocking mechanism to deter nuisance animals. Through cognitive learning, the device teaches animals to keep away from areas where they have established themselves as a problem.

4 Claims, 13 Drawing Sheets

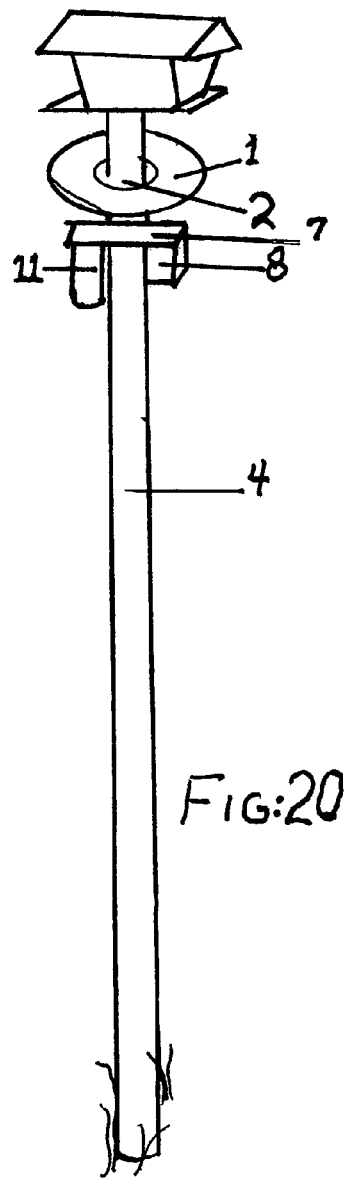
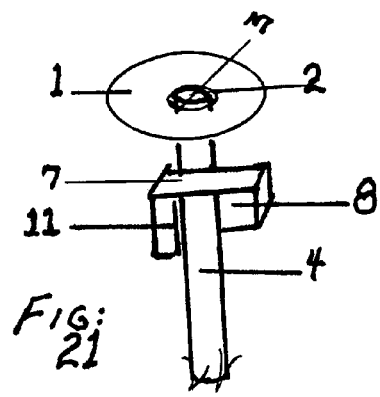
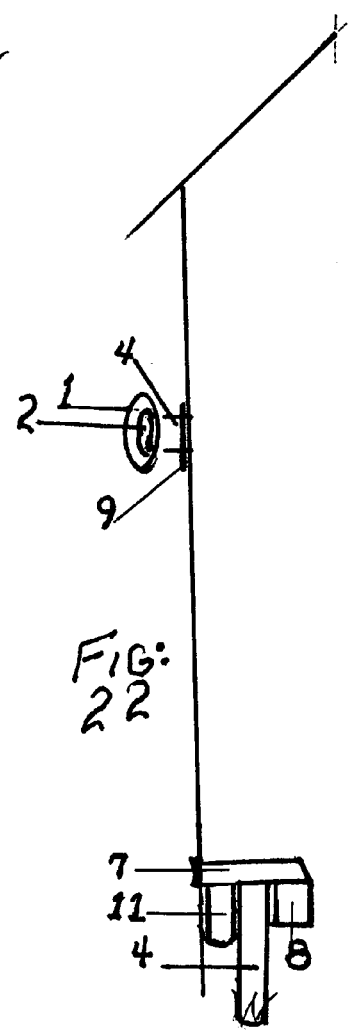
Fig: 20
Fig: 21
Fig: 22

NUISANCE ANIMAL CONTROLLER

Priority based upon the Apr. 3, 2003 filing date of provisional application No. 60/459,702 is claimed for this application.

(B.) CROSS REFERENCE TO RELATED APPLICATIONS (IF ANY)

| | | | |
|---|---|---|---|
| 3,480,176 | Boyd | November 1969 | 220/85 |
| 3,713,580 | Mickleson | January 1973 | 231/7 |
| 5,009,912 | Burman & Burman | April 1991 | 119/720 |
| 5,451,239 | Sewell & Fadil | September 1995 | 47/1.01R |
| 5,892,446 | Reich | April 1999 | 340/573 |
| 5,894,818 | Betzen | April 1999 | 119/712 |
| 6,014,951 | Betzen | January 2000 | 119/712 |
| 6,016,100 | Boyd & Frankewich | January 2000 | 340/384.2 |
| 6,192,621 | Fain | February 2001 | 43/131 |
| 6,519,131 | Beck | February 2003 | 361/232 |

(C.) FEDERALLY SPONSORED RESEARCH AND DEVELOPMENT

None

(D.) INCORPORATION-BY-REFERENCE OF MATERIAL SUBMITTED ON A COMPACT DISC

Not Applicable.

(E.) BACKGROUND OF THE INVENTION (1) Field of the Invention

This invention relates to the field of battery powered electrical repelling and training devices to deter and/or retrain nuisance behaviors in animals.

(2) Description of the Related Art

As human populations have increased and enlarged their living space, so have interactions with wildlife. Many of these animals have lost their natural fear of people and in pursuit of an easy meal bring injury to and damage of property of the human population. Controlling damage caused by nuisance wildlife is a problem most people have been or will be forced to deal with during their lifetime. Various attempts have been made to keep nuisance animals from destroying property ranging from the use of sound (U.S. Pat. No. 5,892,446; Reich), ultra sonic tones (U.S. Pat. No. 6,016,100; Boyd and Frankewich), and jets of water (U.S. Pat. No. 5,009,192; Burman & Burman) to frighten nuisance animals away; to the use of devices which cause physical discomfort to the animal such as foul odors (U.S. Pat. No. 6,192,621; Fain) and placement of grid work in an area to cause discomfort to the feet of animals (U.S. Pat. No. 5,451,239; Sewell & Fadil); to the use of electricity as in the idea of the electric fence (U.S. Pat. No. 3,713,580; Mickleson, Beck; U.S. Pat. No. 6,519,131); and the using of exposed bare electrodes (U.S. Pat. Nos. 5,894,818 and 6,014,951; Betzen). Most nuisance animals are not discouraged for long by odors or sounds used to scare them. Use of electrical devices have been by far the most successful in deterring unwanted animals.

Documented results of field testing on this invention reveals that animals can tell where use of continuous power from electricity to deter nuisance animals is in force and learn how to get around it. This invention is superior to other electrically powered inventions because it gives the predator no clue to danger as he has learned to spot it. This invention does not depend upon power from any source but its own battery, making it fully portable. Due to the specialized internal switching mechanism developed, no power goes to the unit before the animal moves the sheet metal surface which puts out no telltale sounds or sensations to warn animals through their keen senses. As long as the animal cannot pinpoint the danger, he cannot depend on his natural fear instincts to protect himself and will avoid the area under protection.

Compared to the Beck Pat., U.S. Pat. No. 6,519,131, the Beck patent receives power from an electric fence to a rubber mat laid on the ground which is interspersed with electrically conductive particles. When an animal steps on the mat, it receives the shock. In the applicant's invention, power is provided from a 12 volt battery. It is not 'on' continuously; power is put to the sheet metal surface only when the animal has moved it. The rubber matting in the applicant's invention is not a mat laid on the ground as is with Beck. It is a four inch cut round, or circle, from a piece of rubber matting. Its purpose is to provide an insulating effect between the electrical components and the sheet metal surface. The animal never comes into contact with the piece of rubber matting at the center of the sheet metal surface, and, contra to Beck, the rubber matting must be 100% rubber. Any electrically conductive particles in the matting will cause the applicant's invention to fail. In Beck's invention, it is through the mat that the animal gets shocked. In the applicant's Invention, it is through the sheet metal surface that the animal gets shocked. The Beck invention receives continuous power through attachment to an electric fence. The applicant's invention receives power only when called upon through the battery source. The Beck invention is only portable to the extent that it must be attached to the electric fence. The applicant's invention can be placed anywhere.

Compared to the Boyd invention, U.S. Pat. No. 3,480,176, the Boyd invention is meant to attach to a can of conducting material (metal), and electrifies the whole can. The applicant's invention is superior to the Boyd invention in that it can be attached to top of any garbage container. Probably 95% of garbage containers today are of a plastic or rubberized construction. The large containers are about the only metal containers used today. Beck does not describe an ability to deliver power to a container that large; it only describes itself as applicable to smaller household type containers. Since the surface to be electrified is small in the applicant's invention, more power can be sent to the offending nuisance by a strategically placed sheet metal surface. Boyd invention has no on/off switch described so that it would be 'on' all the time. The applicant's invention has both an internal and external switch. The external switch turns power off to the garbage can completely which is an added safety feature. The internal switch delivers power to the sheet metal surface only when called for. A pet our child could touch the can where the applicant's invention is in use and not be shocked as it would be in Beck's invention.

(F.) BRIEF SUMMARY OF THE INVENTION

The purpose of this invention is to deliver an electrical shock to nuisance animals. It is intended to either retrain nuisance behaviors or to run them off where necessary.

(G.) DESCRIPTION OF THE DRAWINGS

A note of reference for consideration before I get into the drawings. In FIGS. 1 through 4 the top of the disk is drawn angled forward at a downward slant for viewing purposes. FIGS. 7 and 8 show the disk in its normal operating position. FIGS. 6 through 9 give details on the components on the underside of the disk and on the upper two inches that cannot be seen with the disk pictured in its angled position.

FIG. 1 is a view of the unit from the front. It reveals that the disk (01), is mounted atop a ½ inch diameter pipe 12 inches long (04) at its center point; the copper collar (06) is placed over the pipe just under the disk; and shows wires (18-A through 18-E) for the electrical operation of the unit. It also shows the bottom of the pipe that has been threaded onto the anchoring bracket (09) which has four screw holes in it for mounting. The rubber matting (02) and threaded end cap (03) for center pipe (04) are seen. It is important for the proper operation of this invention that the rubber matting is not interspersed with electrically conductive particles as Beck requires in his invention U.S. Pat. No. 6,519,131. The rubber must be 100% pure or the invention will not be able to develop the power necessary to create the shock intended for the animal. These features can be seen on FIGS. 2, 3, and 4 also. FIG. 1 provides a visual aid showing the 12 volt battery pack (08) in its holder (20) mounted to the pipe at its tab (26) under the Plexiglas plate (19) with both the positive (13) and negative (14) posts identified on the battery. The protective housing (07) is mounted with the pipe going through it by angle iron (29). The removable front cover plate (25) on the protective housing and #1 switch (10) are also visible.

FIG. 2 is a view of the unit from its right side providing clarity on where the different components are mounted to the center pipe. The battery (08) and holder (20) are centered across the front of the pipe as revealed in FIG. 1.

Placement of components in this manner (as in FIGS. 1 and 2) distributes the weight evenly making the unit stable. The coil (11) is shown going through the protective housing (07), the positive (15) and negative (16) posts, and high tension boot (18) and wire (18-A) on the coil are identified. The negative battery wire (18-B), can be seen going into the protective housing on way to the negative relay through the Plexiglas plate (19).

FIG. 3 is a view from the back of the unit and shows the battery pack (08) mounted beneath the Plexiglas plate (19) at the front of the pipe, viewing also the pipe (04) and coil (11) going through the protective housing (07) as described in FIG. 2. One can also see the ground wire (33) and rod (34) as they are attached to the center pipe by the screw (31) and electrical end hook (32). The high tension wire (18-A), boot (18-L), condenser (12), positive (15) and negative (16) posts on the coil and the back end cover (24) on the protective housing can also be seen from the back view.

Figure 5:
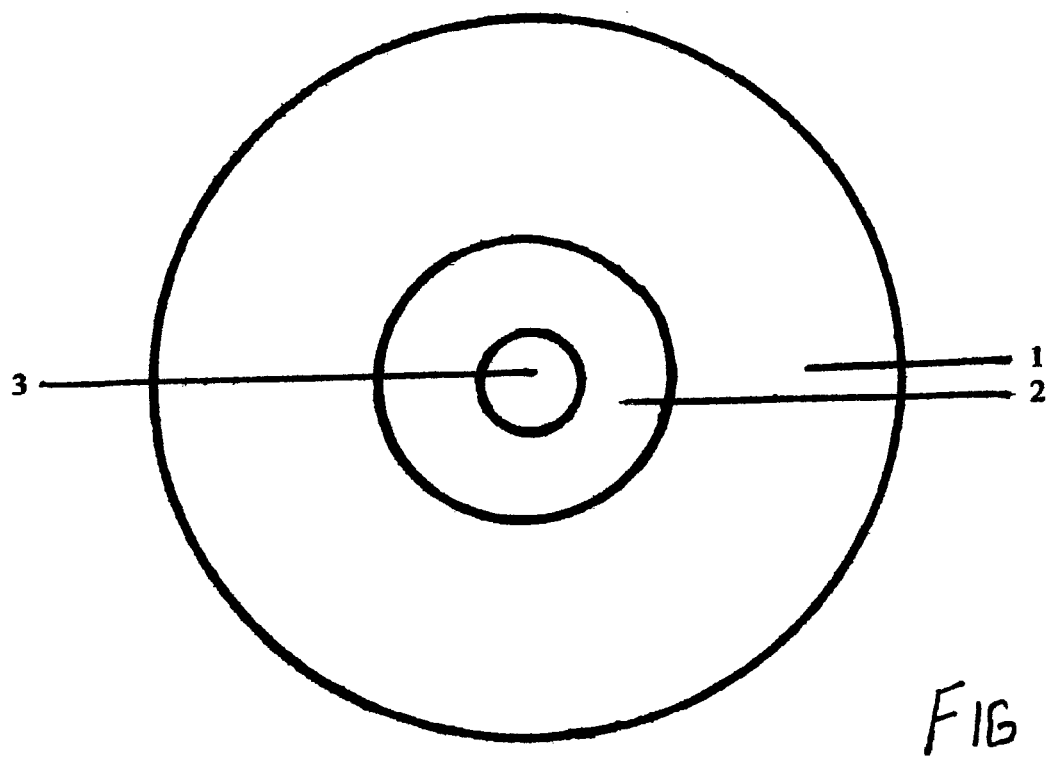
FIG. 5 is a view of the disk from above. The disk (01) is 18 inches in diameter, the stiff rubber matting (02) is 5 inches in diameter and the ½ inch pipe end cap (03) threaded onto the top of the center pipe.
Figure 6:
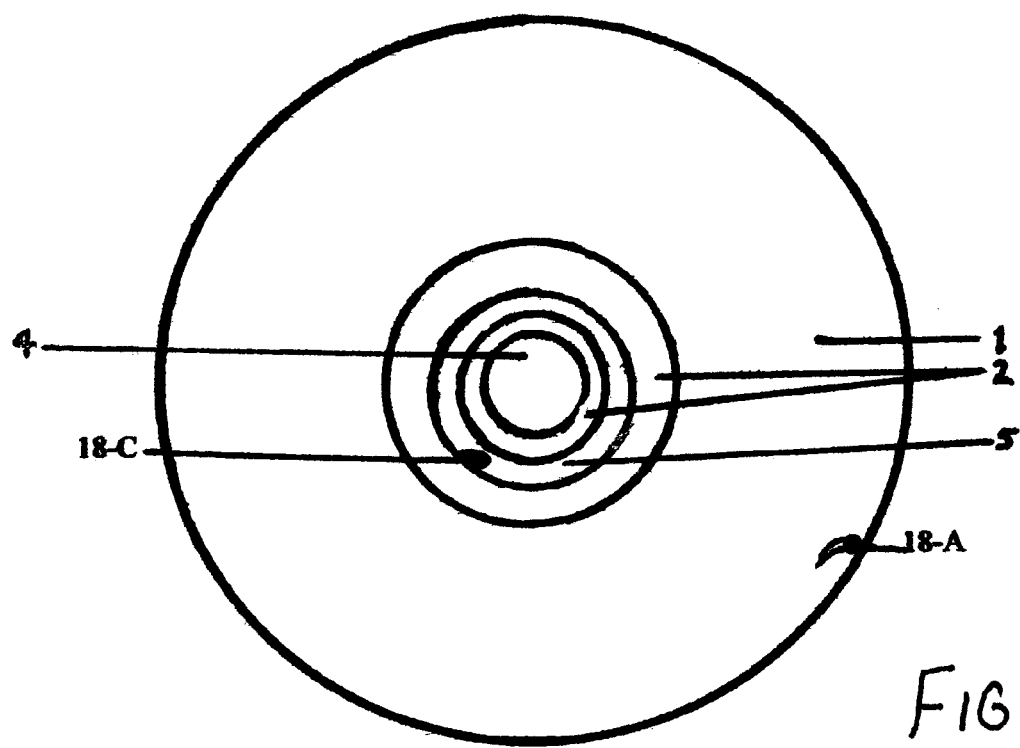

FIG. 6 is a view of the disk from underneath. The disk and rubber matting are seen as described in FIG. 5. The center circle is the pipe (04) extending down the disk and the oversized washer (05) riveted to the rubber matting (02) is sufficient in size to ensure matting between washer and pipe to insulate. The electrical wire (18-C) hooked to the washer near the center of drawing is the upper half of #2 switch. The wire the out fringes of disk is high tension wire (18-A) coming from coil.

Figure 7:
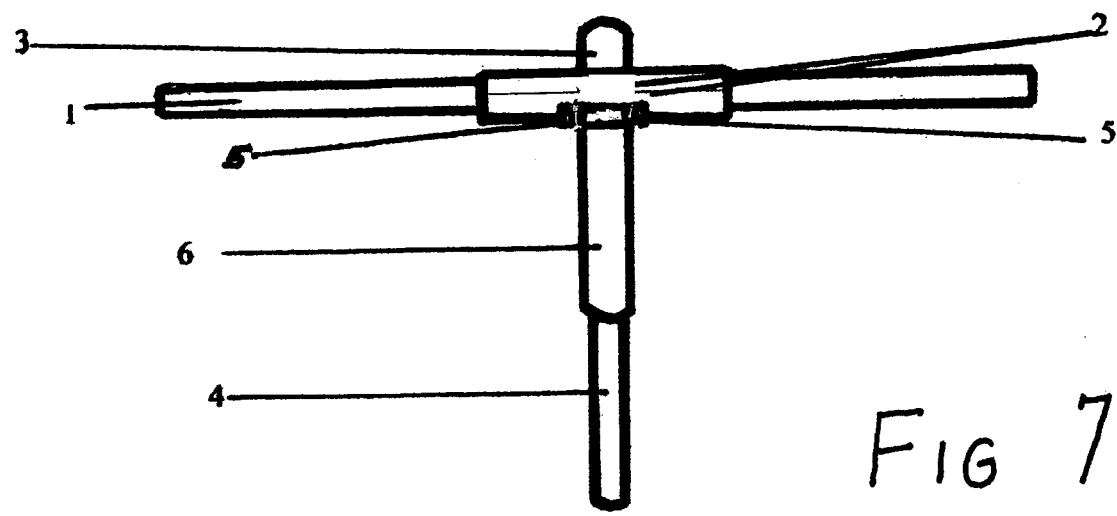

FIG. 7 is a cross sectional view of the disk as mounted on pipe in a level operating position with top 1½ inches of pipe and various components. The disk (01) can be seen as arm of figure taking space from both ends of arm inward to where rubber matting (02) covers center of pipe (04). The upper portion of pipe (04) is shown with copper collar (06) and threaded end cap (03) in place. The stiff rubber matting (02) is riveted to both upper and under sides of disk (01) with oversized washer (05) riveted to the underside of the rubber matting in such a fashion that the washer is facing downward and the rubber matting touches the copper collar itself at the center of the disk for an electrical insulating effect. The center pipe (04) is seen extending below the copper collar that has been slipped over the pipe.

Figure 8:
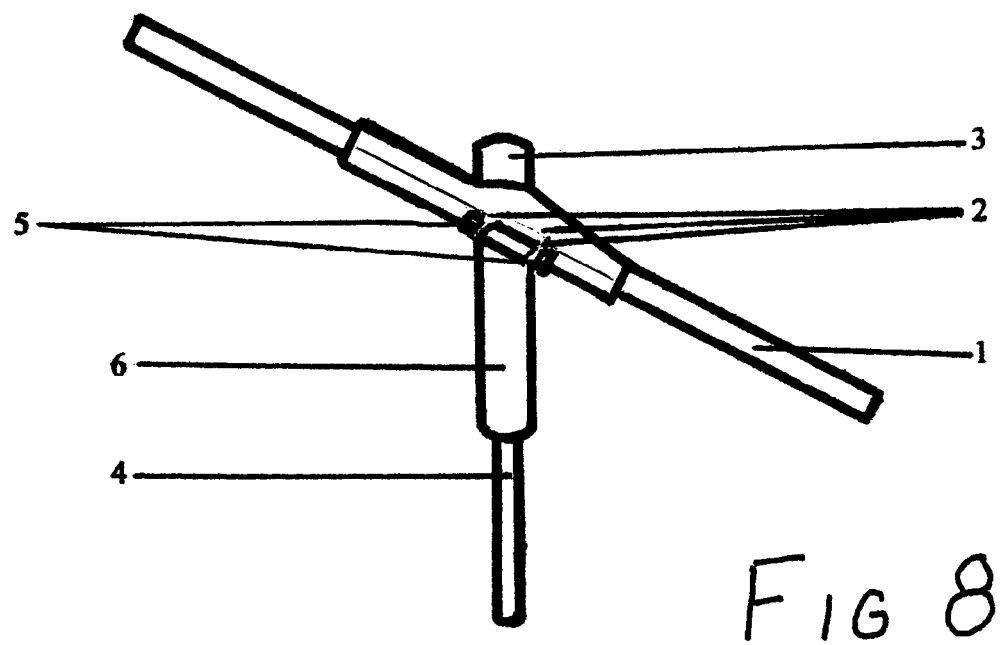

FIG. 8 is a view as described in FIG. 7. It differs from FIG. 7 in that it's a view of same parts as they appear when in use. Both point and direction of pressure on the disk resulting in movement will always force the pliable rubber matting (02) in the center reconfigure itself to cause the disk (01) and oversized washer (05) to move in a downward direction at or opposite to the point of contact by the offending character. This action permits the oversized washer to come into contact with the copper collar (06) thus completing the circuit to form the #2 switch in the unit and delivers a shock to the offending animal. A cross sectional view of the oversized washer, rubber mat and copper collar is found in FIG. 9, described in paragraph 0023 of this application, and the parts in action as found in FIG. 10, described in paragraph 0024 of this application.

Figure 9:
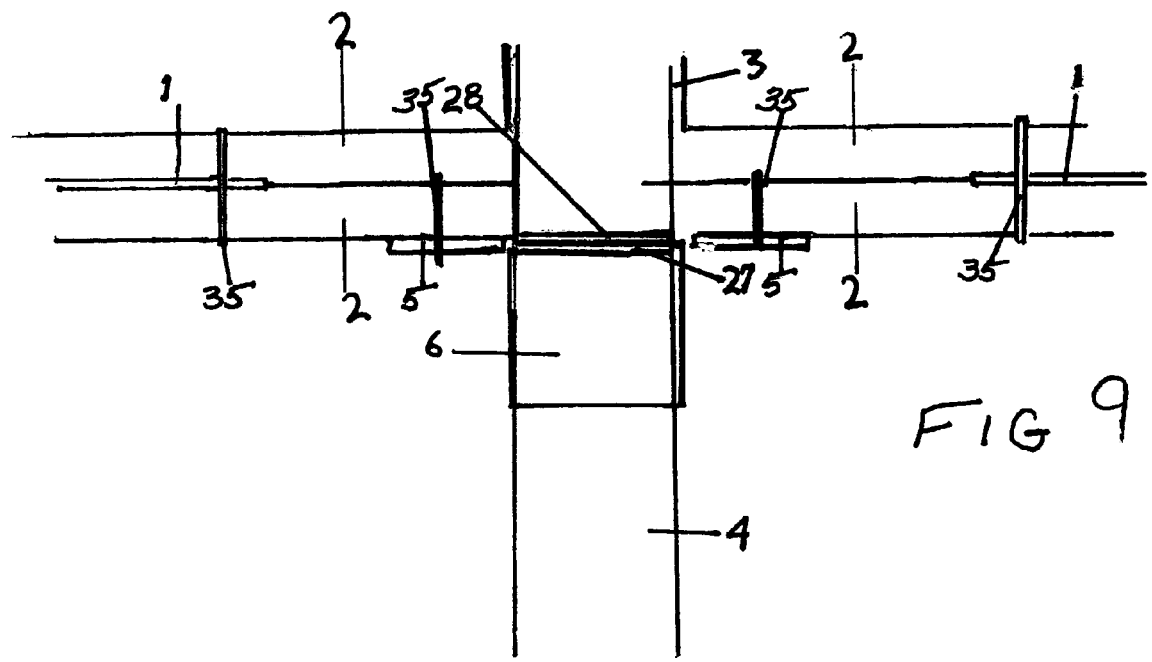

FIG. 9 is the cross sectional view introduced at the end of the description of drawings FIG. 8, paragraph 0022 of this application. FIG. 9 shows how the disk (01), rubber mat (02), copper collar (06) and oversized washer (05) fit together to form the #2 switch action.

Figure 10:
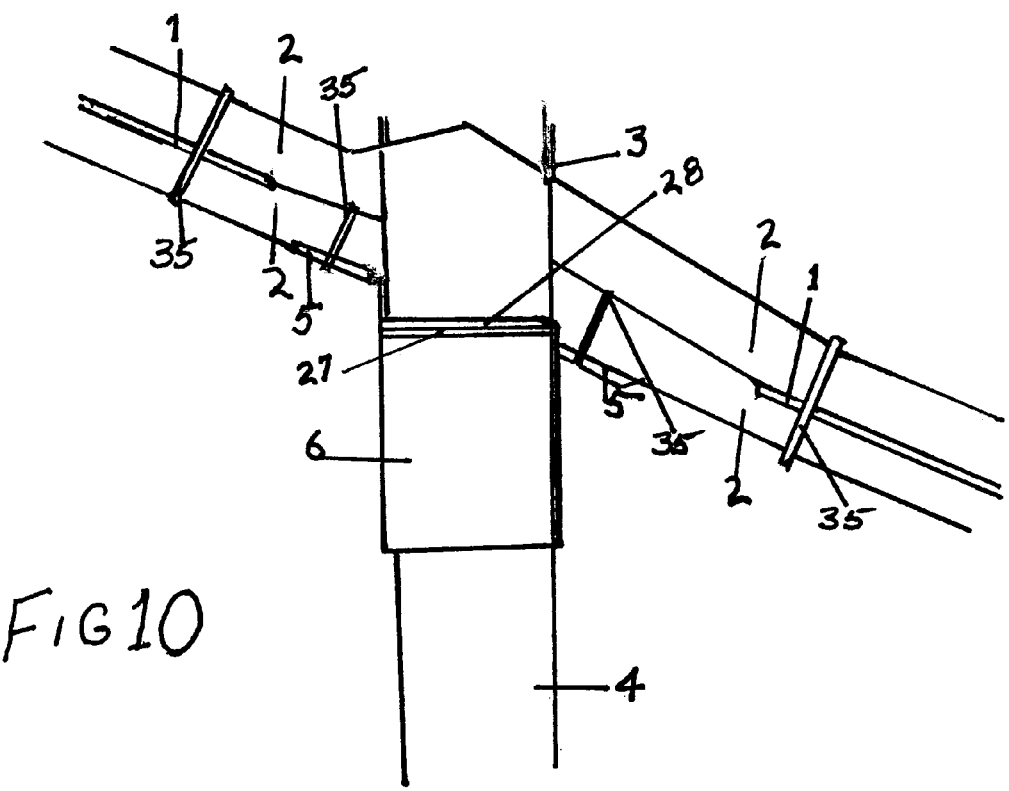

FIG. 10 is the cross sectional view of the components described in paragraph 0020 for FIG. 9 in action.

Figure 11:
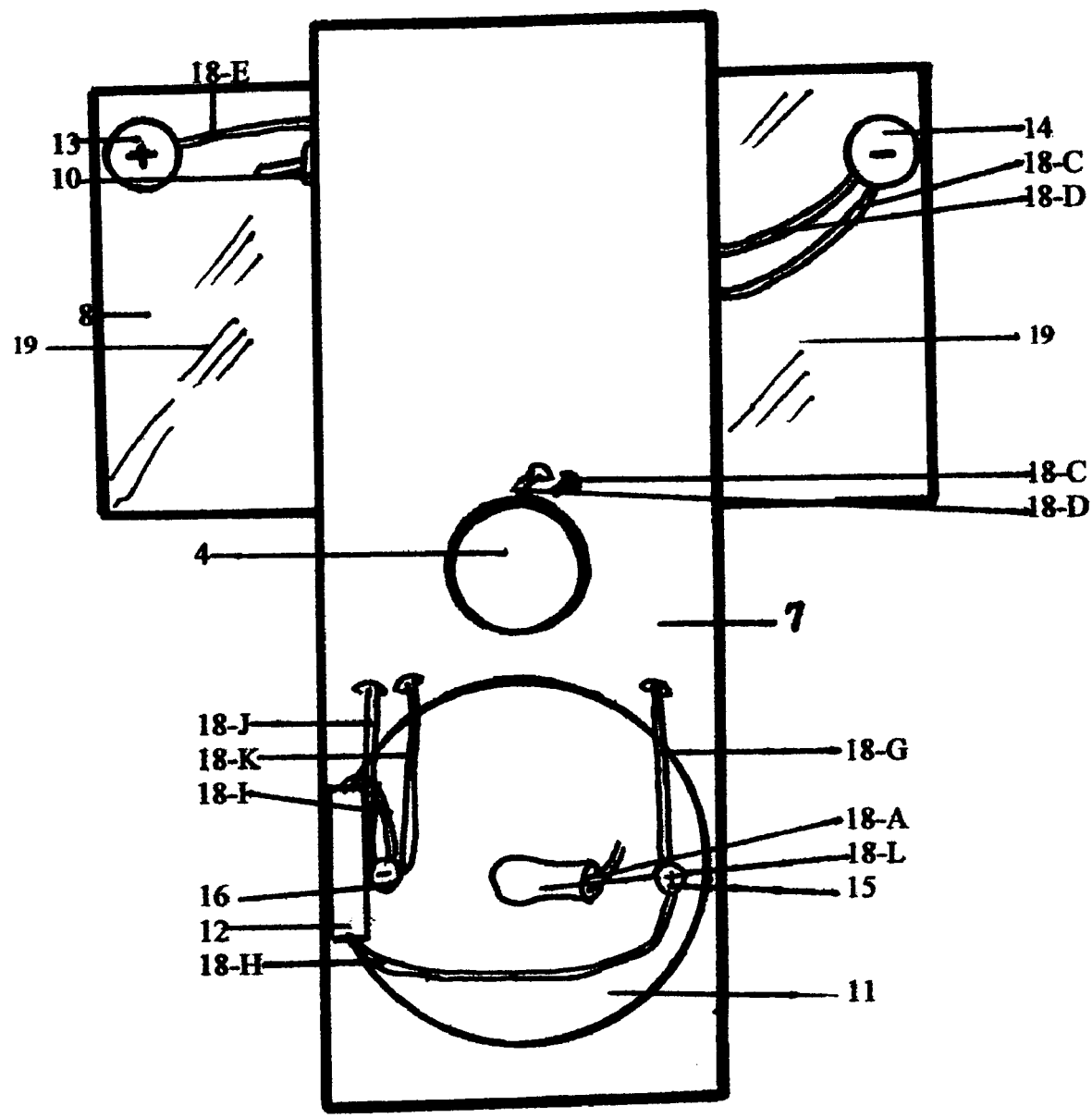

FIG. 11 is a view of the unit in its upright position from above with the disk removed. It reveals the top of the protective housing (07), the Plexiglas covered (19) battery pack (08) with the negative (14) and positive (13) battery posts exposed. The positive battery post wire (18-E) to the #1 switch is revealed as well as the negative battery post wires (18-C and 18-D) forming the #2 switch entering into the protective housing on the side and passing out from the top of the protective housing. The #1 switch (10) is evident-the toggle, the condenser (12), and coil (11) with the high tension wire (18-A) and boot (18-L) labeled. You see the positive battery wire (18-G) coming out from the top of the protective housing going to the positive post (15) on the coil and continuing to the positive side of the condenser (18-H). You also see the negative wires (18-J, 18-K) from the negative relay inside the protective housing to the negative post (16) of the coil, and the wire from the negative coil post passing to the negative (18-I). The center pipe (04) is representative by the circle in the center of the protective housing. The views of the battery and protective housing parts are not represented in the same gauge in FIGS. 11 and 12 as the outline of the disk in FIG. 11. In actual size, the disk measures 18 inches in diameter, the protective housing is 8 inches by 2½ inches, and the battery pack is 3¼ inches by 6½ inches.

Figure 12:
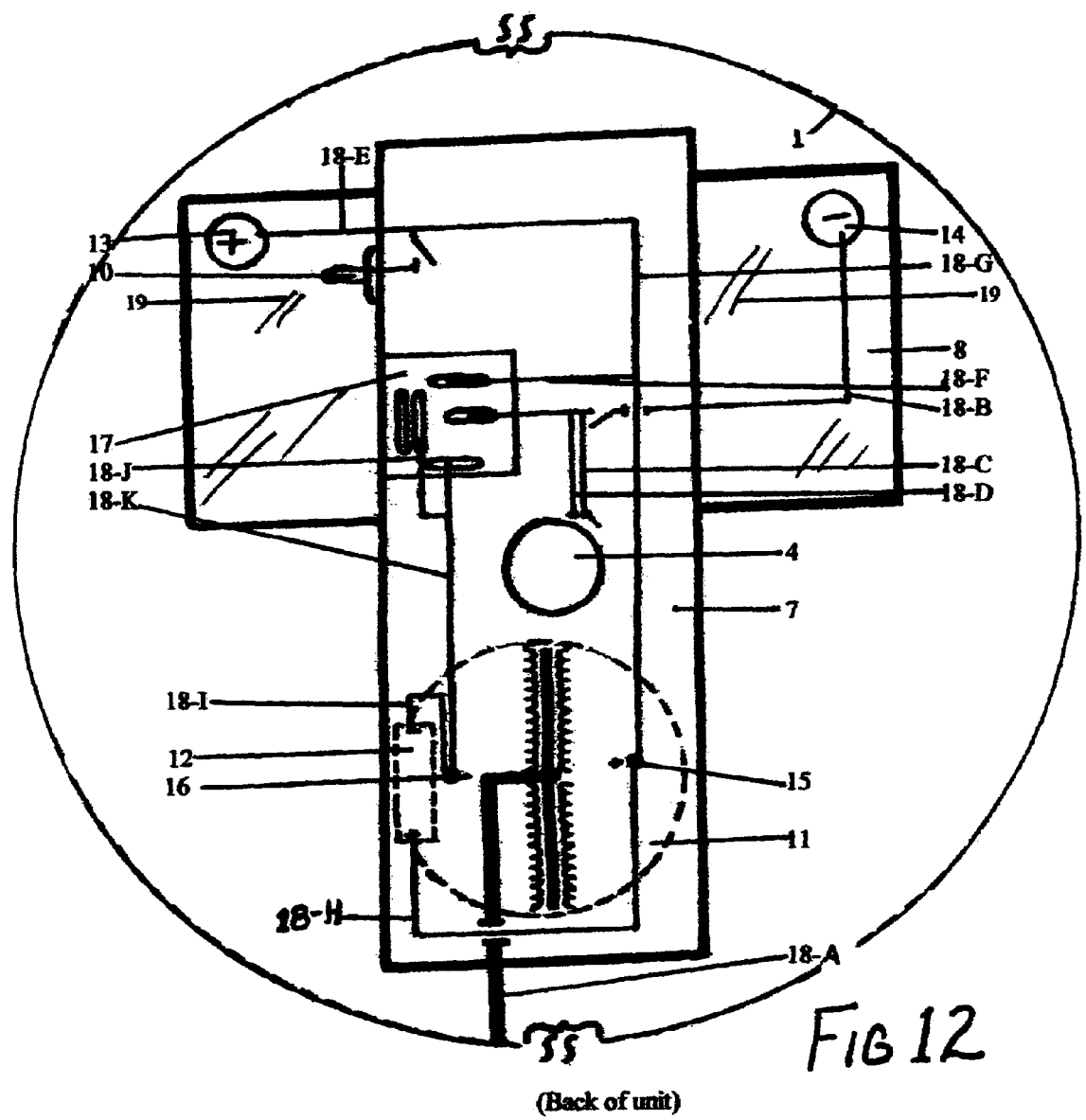

FIG. 12 reveals the contents of the protective housing and is a wiring diagram. The reference numbers listed in FIG. 13 can be identified from the Index of Reference Numbers For Drawings found on pages 12 and 13.

Figure 13:
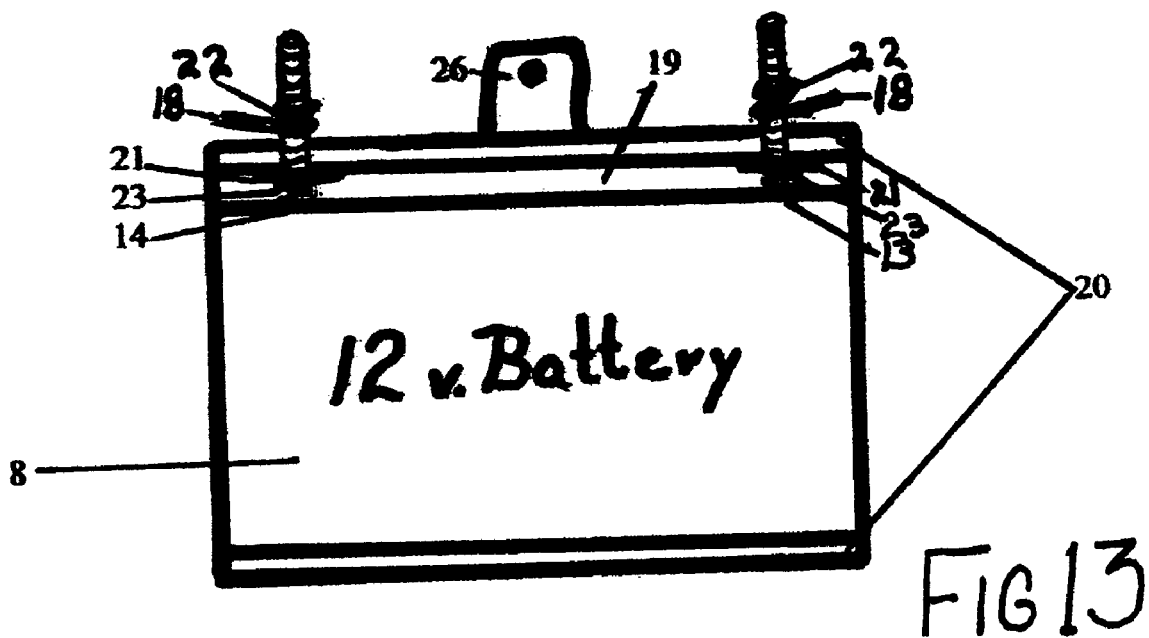

FIG. 13 is a view of the battery (08) with hookups as mounted to the Plexiglas cover plate (19). The Plexiglas plate helps hold the battery in place in the battery holder (08), as well as providing a way to hook up the electrical wires for the battery. The Plexiglas plate and disk over the top serve to cover the components to 10 protect the mechanism from weather issues. In both FIG. 13 and FIG. 14, the tab (26), the ledge (30), and the Plexiglas plate (19) are visible. The battery (08), battery holder (20), and contact springs (23) are visible. Wires (18) are shown to be put into place on the copper pop rivet (21) and screwed down by nut (22).

Figure 14:
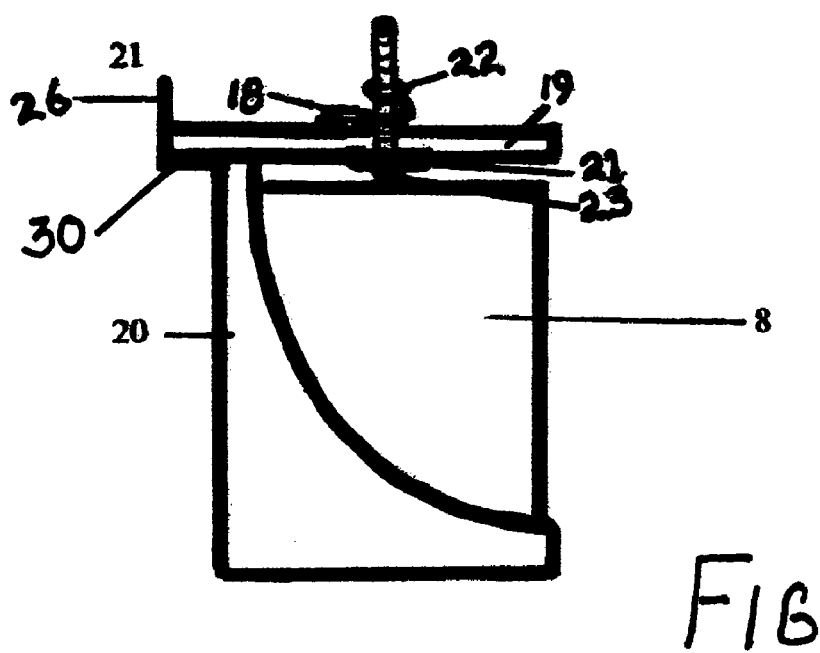

FIG. 14 is a view of the Plexiglas plate (19), the battery (08) and battery holder(20), and the hookups as seen from the right side of the unit. A view of the left side is a mirror image of the right side.

Figure 15:
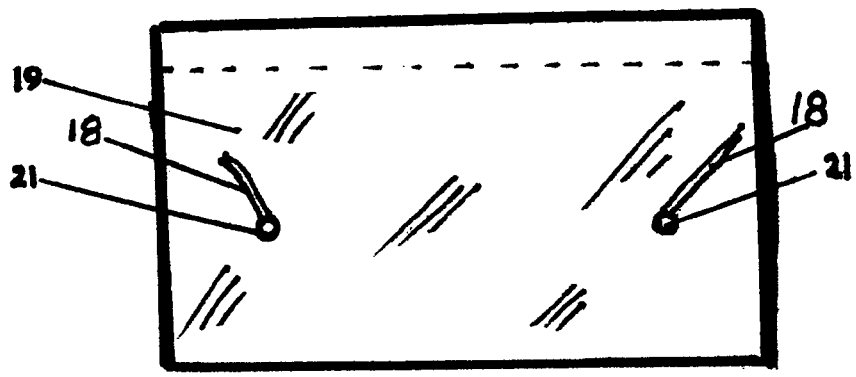

FIG. 15 is a view of the Plexiglas plate (19) on top of the battery holder (20). The tops of the copper rivets (21) can be seen as well as the electrical wires (18). The area above the dotted line in FIG. 15 is the surface that is riveted to the ledge on the battery holder.

Figure 16:
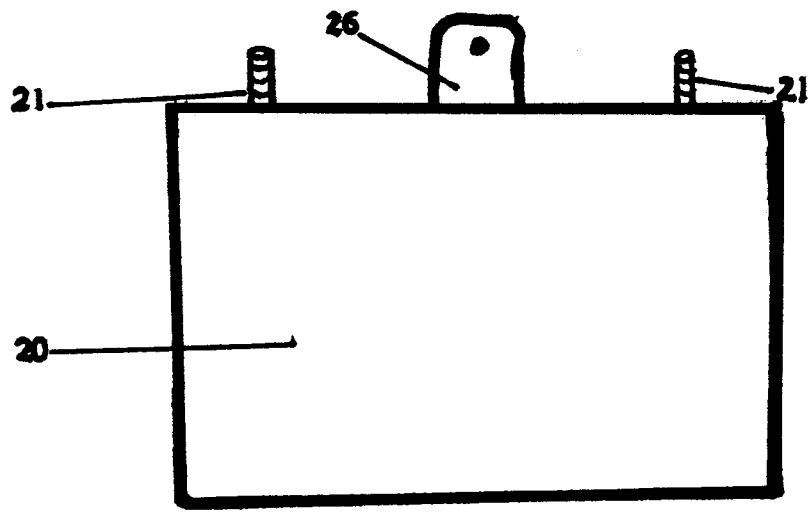

FIG. 16 is a view of the battery holder (20) from the back. The top of the copper rivets (21) and the back side of the mounting tab (26) for mounting to the center pipe is all that can be seen.

Figure 17:
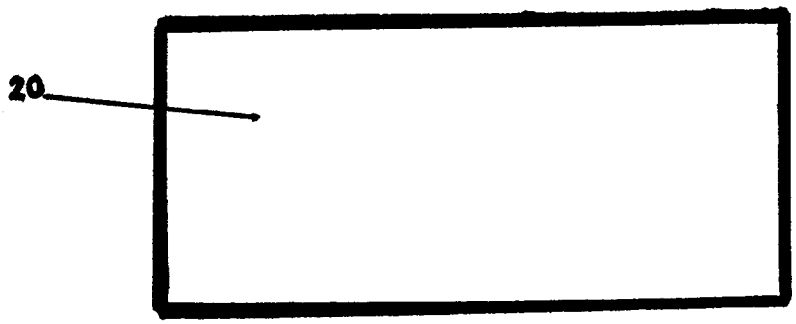

FIG. 17 is a view of the bottom of the battery holder (08) and is unremarkable.

Figure 18:
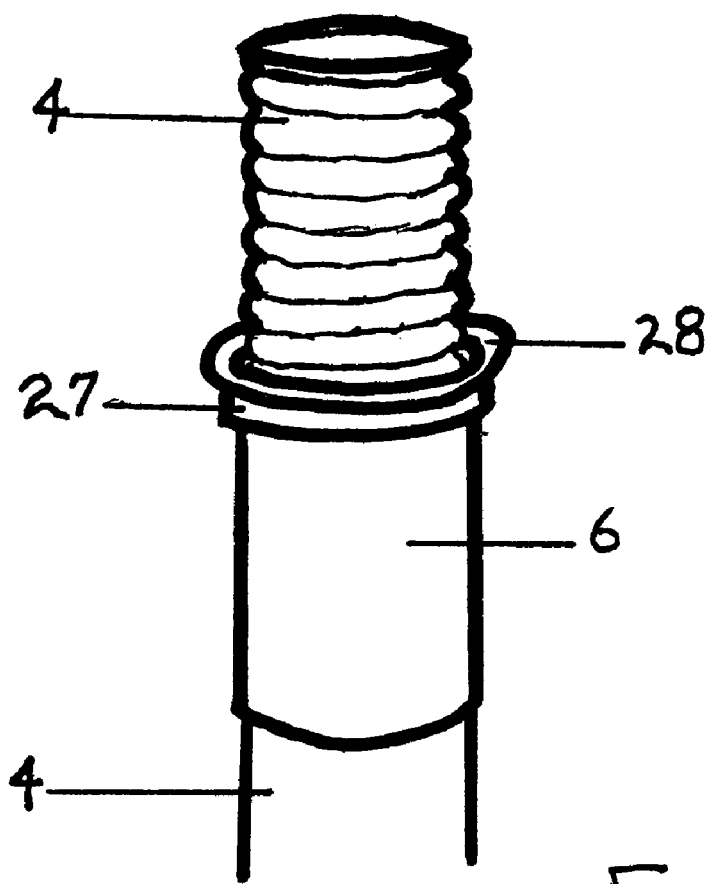

FIG. 18 is a view of the upper 1¾ inches of the pipe without the sheet metal surface in place. It shows the threading, the conduit connection ring threaded down as far as it can go to rest at the upper edge of the copper collar and the fiber washer in place to be used as the resting ledge for the disk to sit on when in place for use.

Figure 19:
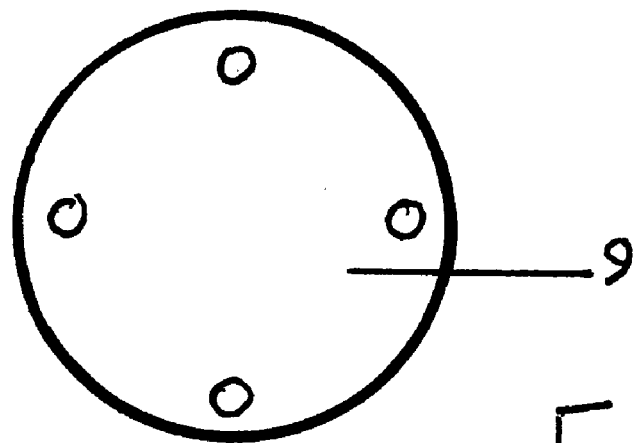

FIG. 19 is a view of the unit from its bottom side. All that can be seen is the bottom of the anchoring bracket (09) with its four anchoring holes visible.

FIGS. 20–22 are views of the invention in its different applications. The purpose is to show the unit looks when put together for operation.

INDEX OF REFERENCE NUMBERS FOR DRAWINGS

| Reference Number | Description |
| --- | --- |
| 01 | 14 Gauge Sheet Metal Disk, 18 Inches In Diameter With Edges Turned Under (Finished) |
| 02 | Stiff 100% Rubber Matting, 5 Inches In Diameter (Cut 2) Without Electrically Conductive Particles |
| 03 | ½ Inch Diameter Threaded End Cap Turned Onto Pipe |
| 04 | ½ Inch Diameter Threaded Black Pipe 12 Inches Long |
| 05 | Oversized Washer |
| 06 | ½ Inch Diameter Copper Collar ¾ Inch Long, Heat Stretched Over Pipe |
| 07 | Protective Housing |
| 08 | 12-Volt Battery |
| 09 | Anchoring Bracket To Receive ½ Inch Treaded Pipe |
| 10 | #1 Switch |
| 11 | Coil |
| 12 | Condenser |
| 13 | Positive Post On Battery |

INDEX OF REFERENCE NUMBERS FOR DRAWINGS -continued

| Reference Number | Description |
| --- | --- |
| 14 | Negative Post On Battery |
| 15 | Positive Post On Coil |
| 16 | Negative Post On Coil |
| 17 | Relay |
| 18 | Wiring |
| 18-A | High Tension Wire |
| 18-B | Negative Battery To Negative Relay |
| 18-C | Negative Battery To Oversized Washer |
| 18-D | Negative Battery To Copper Collar On Pipe |
| 18-E | Positive Battery To #1 Switch, Toggle Switch |
| 18-F | Positive Battery To Positive Relay |
| 18-G | Positive Battery To Positive Coil |
| 18-H | Positive Coil To Negative Condenser |
| 18-I | Negative Coil To Negative Condenser |
| 18-J | Negative Relay To Negative Coil |
| 18-K | Negative Relay To Negative Coil |
| 18-L | High Tension Wire Boot On Coil |
| 19 | Plexiglas Plate For Battery Hookup |
| 20 | Battery Holder |
| 21 | Copper Pop Rivets Threaded |
| 22 | Nut |
| 23 | Contact Springs On 12-Volt Battery |
| 24 | Protective Housing Back End Cover |
| 25 | Protective Housing Front End Cover, Removable |
| 26 | Battery Holder Mounting Tab |
| 27 | Conduit Connection Ring |
| 28 | Fiber Washer |
| 29 | 90 Degree Bracket For Mounting Protective Housing To Pipe |
| 30 | Shelf On Battery Holder For Mounting Plexiglas Plate |
| 31 | Ground Hook Up Screw, ¼ Inch By One Inch Long |
| 32 | Standard Electrical End Piece To Attach To Wire |
| 33 | 14 Gauge Copper Wire, 18 Inches Long |
| 34 | Copper Grounding Post 2 Feet Long |
| 35 | Pop Rivets (Standard, Not Copper As In #21) |
| 36 | Screws |

(H.) DETAILED DESCRIPTION OF THE INVENTION

A device intended to deliver an electrical shock to nuisance animals. It is intended to scare them away from areas where they are unwelcome or to retrain nuisance behaviors without intent of running the animal off. The unit can be set up in varying configurations, sizes, stiffness of matting, and mounting styles to use in dealing with various nuisance animals.

Due to the advantages in my unique internal switching mechanism, it is impossible for the animal to avoid being shocked when it comes into contact with the unit.

The invention does not receive power until the disk is moved thus eliminating the issue of draining a battery of its power when not in use. It also eliminates the need for a recharging system (generator).

The invention consists of a flat sheet of metal (referred to as a disk in this application) mounted atop a center pipe, relay, condenser, and various wiring configurations in a protective housing, with the coil going through the protective housing and a 12-volt battery in battery holder mounted to the center pipe.

The invention can be used with or without bait. If the offender is destroying property to get to food, in a bird feeder or beehive for example, the unit can be used without bait and installed to sit in the animal's way to get to the prize. With the unit stalled appropriate to the application, the animal cannot get to the food without first making contact with and moving the sheet metal surface, the animal well be shocked and as documented in field testing, will run off. If the offender is used to being fed, placing the food on top of the disk surface will entice the animal to the sheet metal surface. In this case, the animal will be shocked on the tongue which is one of the most sensitive parts of the body, and will leave the area all together. The invention is still in the field testing stage and has been documented a successful invention in performing exactly as designed.

The invention can be altered to use with most nuisance animals. If dealing with a bear, as I have been in my trials, one would use a more stiff rubber matt in the center than one would use to deal with squirrels or chipmunks. The size and gauge of the sheet metal disk can be altered, again for dealing with animals of different size and strength. The shape of the disk can be altered for use in different situations. For example, if you are protecting a bird feeder from nuisance animals, the proper configuration of the disk would be round and installed on the feeder pole below the feeder. But if one is attempting to protect a beehive from nuisance animals, a square sheet metal surface would be more appropriate due to the large size it would require to fully cover the surface area of a square object with a round disk. I have completed research to determine the direction of attack a bear takes in getting honey from hives. However, if the offender learns to attack from the sides as opposed to the top as is standard for the bear, the addition of a metal net attached to and powered through the sheet metal surface draping the sides of the hive would be appropriate. The mounting of the unit can be altered for effectiveness in other applications. A disk could be mounted to the side of a building or other structure to deal with specific problems.

The unit is remarkably simple in its operation. An offending animal moves the disk when they touch it. It matters not from with direction the animal touches or pushes the disk which can best be visualized in FIGS. 7 and 8 of the drawings. The animal can push it down or pull it up, move it in or out, or move it side to side and the rubber matting in the center will always reconfigure itself to force the round center to move in a downward direction. The oversized washer attached to rubber matting piece of underside of the disk will then make contact with the copper collar on the pipe. This completes the circuit required to form the number 2 switch. The battery delivers power through the relay to the coil, and to the high tension wire mounted underneath toward the outside of the disk. The electrified the whole metal surface and delivers the shock to the offending animal.

The invention is powered by a 12-volt battery which is 4½ inches in height, 6½ inches in width, and 3¼ inches in depth. It is designed to deliver an electrical shock to nuisance animals when the disk is moved in any direction. A parts list is compiled in the "Index of Reference Numbers for Drawings", on pages 12 and 13. Using the index reference numbers, constructing the unit described is accomplished in the following steps:

1. Start with index reference number 04, a ½ inch diameter piece of black pipe 12 inches long, threaded down 1½ inches from the top end and 1 inch up from the bottom. Use anchoring bracket (Index Ref # 09) that has four mounting screw holes in it. Screw the bottom end of the pipe (1 inch thread end) onto the bracket and set aside.
2. Use a 12-volt battery (Index Ref. # 08). Make a battery holder to fit the size of battery you use (Index Ref. # 20) as shown in FIGS. 13 and 14 with shelf for mounting Plexiglas plate (30) and tab (26) with hole near top center for mounting to this pipe. Cut a piece of ¼ inch Plexiglas (19) sized to fit on the shelf and over the battery you have chosen. Drill an appropriately sized hole to accommodate the size of your copper pip rivets (21) in the Plexiglas at points directly above the positive (13) and negative (14) battery posts. I am using belting pop rivets that are copper and have a ½ inch flat head on them. Thread the ends of the copper rivets (21) and get nuts (22) the same size. Insert rivets into the hole and screw the nut on to hold in place. The appropriate wires will be installed later. Drill two additional holes at the back of the Plexiglas plate (19) and through the shelf (30) on the battery holder (20) and rivet (35) the Plexiglas plate in place. Drill these holes the size you need for the pop rivets you have chosen. Set aside.
3. Use 14 gauge sheet metal which has been cut into a circle which is 18 inches in diameter (01) and has had the edges finished so as not to cause injury. Use stiff rubber matting, cut two circular pieces that are 5 inches in diameter (02). The stiffness of the rubber matt will depend upon the animal you want to control. Here we are working with bears, so the matting is quite stiff. In any case, the matting has to be stiff enough to stand up to wind and not be blown about easily. If necessary, an insulated rubber strap can be used as a tie down when fastened to four equal points on the disk.
4. Cut a 4-inch hole in the center of your disk (01) and a scant ½ inch hole in the center of your matting pieces (02) for tight fitting over the center pipe which will be done later. Get an oversized washer, two inches in diameter with a ¾ inch center hole (05) which is ¼ inch thick. Center and pop rivet (35) it to the underside of what will be the bottom matt. Place the two pieces of matting on the disk, one on the top side of the disk and the other on the bottom side in sandwich fashion making sure that your oversized washer is on the bottom side with the washer itself facing down as shown in FIG. 18. Make sure your ½ inch center holes are made at the exact center position of the matt you have prepared, that they are installed at the exact center point on the disk, and that they are centered to one another on the top and bottom of the disk so that you end up with the center hole in the matting sitting in the exact center position of the disk. Pop rivet in place, going through the two layers of matt and disk as shown in FIG. 18. From the underside you'll see the washer, matting and disk all centered (FIG. 18 of drawings), and from the top side you will see the matting and the disk centered (FIG. 5 of the drawings).
5. Construct the protective housing (08) using 2½ inch pvc house gutter drain spout 8 inches long. Drill a ½ inch hole at the exact center point of the housing through both the top and bottom side. Cut a hole 2¼ inches in diameter at a point exactly centered from side to side and 1½ inches forward from the back of the housing, cutting through both the top and bottom sides of the housing as seen in FIG. 11. The 2¼ inch measurement is the diameter of the bottom portion of my coil (11). Make a tight fit. Construct two end covers (24, 25) out of a 3 inch square piece of sheet metal which has been sized down to fit the 2½ inch protective housing size by bending the edges of the sheet metal up ¼ inch on all sizes. Install back end cover (24) with rivets (35) through the protective housing on all sides. Hold the front cover for later.
6. Purchase a 5-prong fuel pump relay (17) for a 12-volt system (I used Ford replacement part). Anchor to the inside of the protective housing (08) at center left, and install toggle switch (10) according to manufactures directions towards the front of the unit. Wire the unit according to wiring diagram in FIG. 12 as follows:

a. The high tension wire (18-A) from the coil (11) will go to the outer edges of the disk (01).

b. Holes sufficient to feed the thickness of your wire through will have to be drilled in the protective housing (07) at points closest to the positive and negative posts on your battery for your wires to pass to the inside of the protective housing.

c. Wire from the negative post (04) on the battery will go to the Plexiglas plate (19) and through the hole drilled in the side of the protective housing. It will then be split. One wire will go to the negative relay (18-B). Two wires will be sent to exit the protective housing, one through each of the holes drilled next to the center pipe holes (04), on top of the protective housing (07). This can be seen quite well in FIG. 11. Once outside the protective housing, one wire (18-C) will be sent to the oversized washer (05) on the underside of the disk as seen in FIG. 6. And the second wire (18-D) to the copper collar (06) on the center pipe (04) as seen in FIG. 18. These actions complete what I call my specialized internal switch, the #2 switch. The top half of the switch is the negative wire (18-C) soldered to the oversized washer (05) and the bottom half is the negative wire (18-D) soldered to the copper collar (06). When these two points come together, the circuit is completed and power is delivered to the disk surface (01), and the offender receives the shock. The over sized washer and copper collar come into contact when an animal moves the disk shown in FIG. 19. Additionally, since there is no power to the disk surface until called for, there is no draw on the battery.

d. A wire from the positive post (13) on the battery (08) will be hooked to the Plexiglas plate (19) and through the hole drilled in the side of the protective housing. It will then split. One wire (18-E) will go to the #1 switch (10). Another wire (18-F) from the positive will go to the positive in the relay (17). And yet another wire (18-G) will go to the positive post (15) on the coil (11) the wire (18-H) then continuing to the positive side of the condenser (12). A negative wire (18-I) from the negative post (16) on the coil (11) will go to the negative side of the condenser (12).

e. Two negative wires (18-J, 18-K) on the relay (17) will combine to go to the negative post (17) on the coil (11) and there will be a boot (18-L) installed on the high tension post on the coil (11) on its top which is on the outside of the protective housing (07), as can be seen better in FIG. 11.

7. From FIG. 18 use flexible ½ inch copper tubing (06) that is ¾ inch long, heated enough to stretch it over the ½ inch center pipe (04) to form a collar. Push the copper collar down on the pipe to where the top will sit just under the last thread of 1½ inch threaded end of the center pipe. Thread the conduit connection ring (27) onto the pipe tight to the last thread on the pipe, followed by the fiber washer (28) to sit just above the upper edge of the copper collar (06). The rubber matting (02) will be kept up by this ring and washer combination.

8. After all electrical components and wiring have been put in their proper place, as instructed in FIG. 12 of the drawings, attach the protective housing end covers. Attach the back end cover (24) using the standard pop rivets (35) you have chosen for the job by drilling the appropriately sized holes in the end cover and protective housing, then installing. Attach the front end cover (2) in the exact fashion except that you should substitute the pop rivets with small screws (36) in sufficient length to go through the protective housing and end cover so that it will be removable should the need arise.

9. Use two 90 degree brackets (29) with metal screws (36) to attach the protective housing to the center pipe in two places, one toward the front of the housing and another toward the back so that the top sits just below the ¾ inch copper collar (06). Attach the battery (08) and holder (20) with a screw (36) into the tab (36) to the front side of the center pipe (04) so that it sits just below the 90 degree bracket (29) which is holding the protective housing in place. Place completed disk setup over the pipe (04) to let it rest on the conduit ring (27) and fiber washer (28). Place the ½ inch end cap (03) over the top and tighten snuggly making sure not to over tighten which could push the rubber center over the conduit ring and fiber washer combination.

Figure 1:
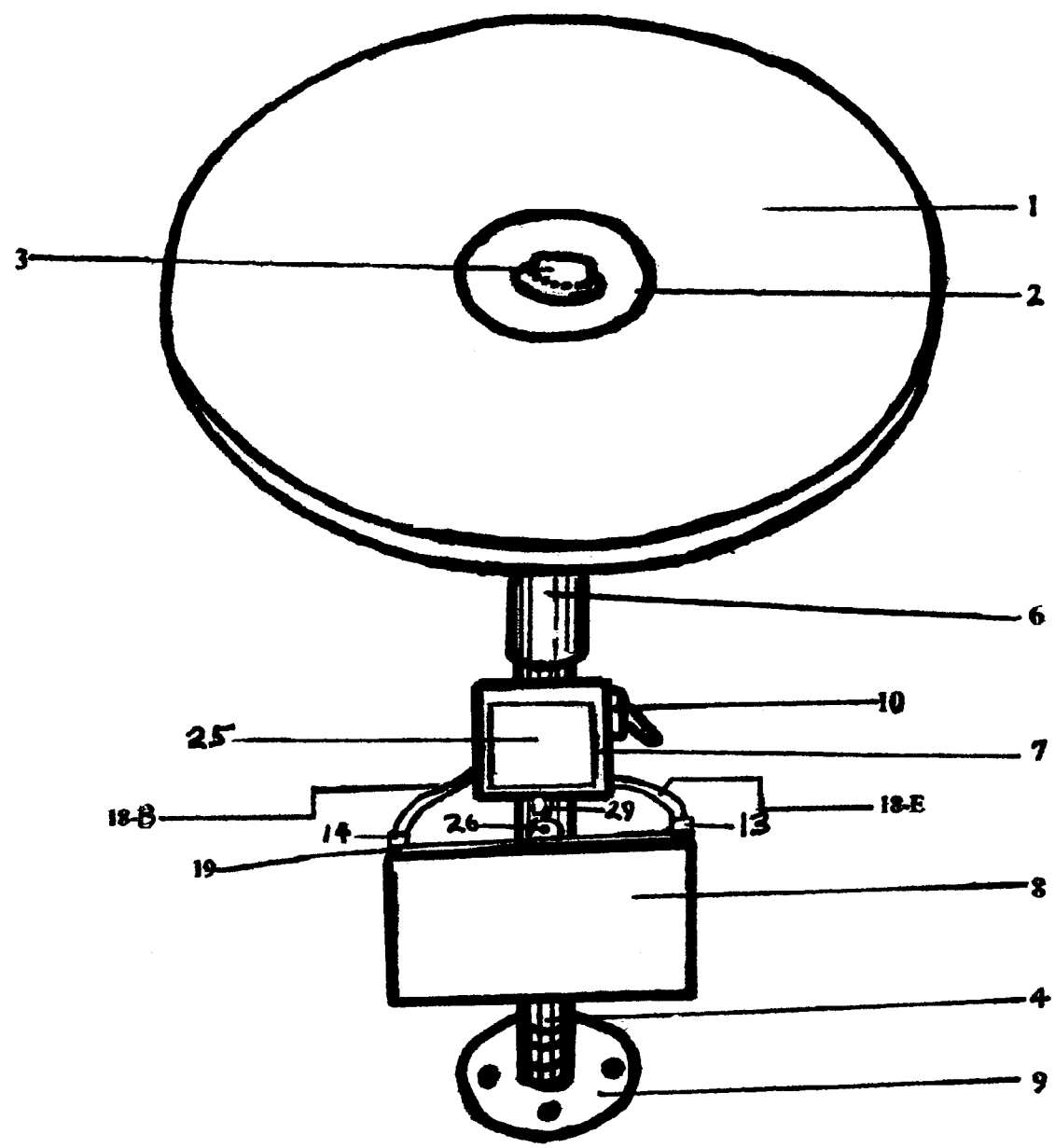
Figure 2:
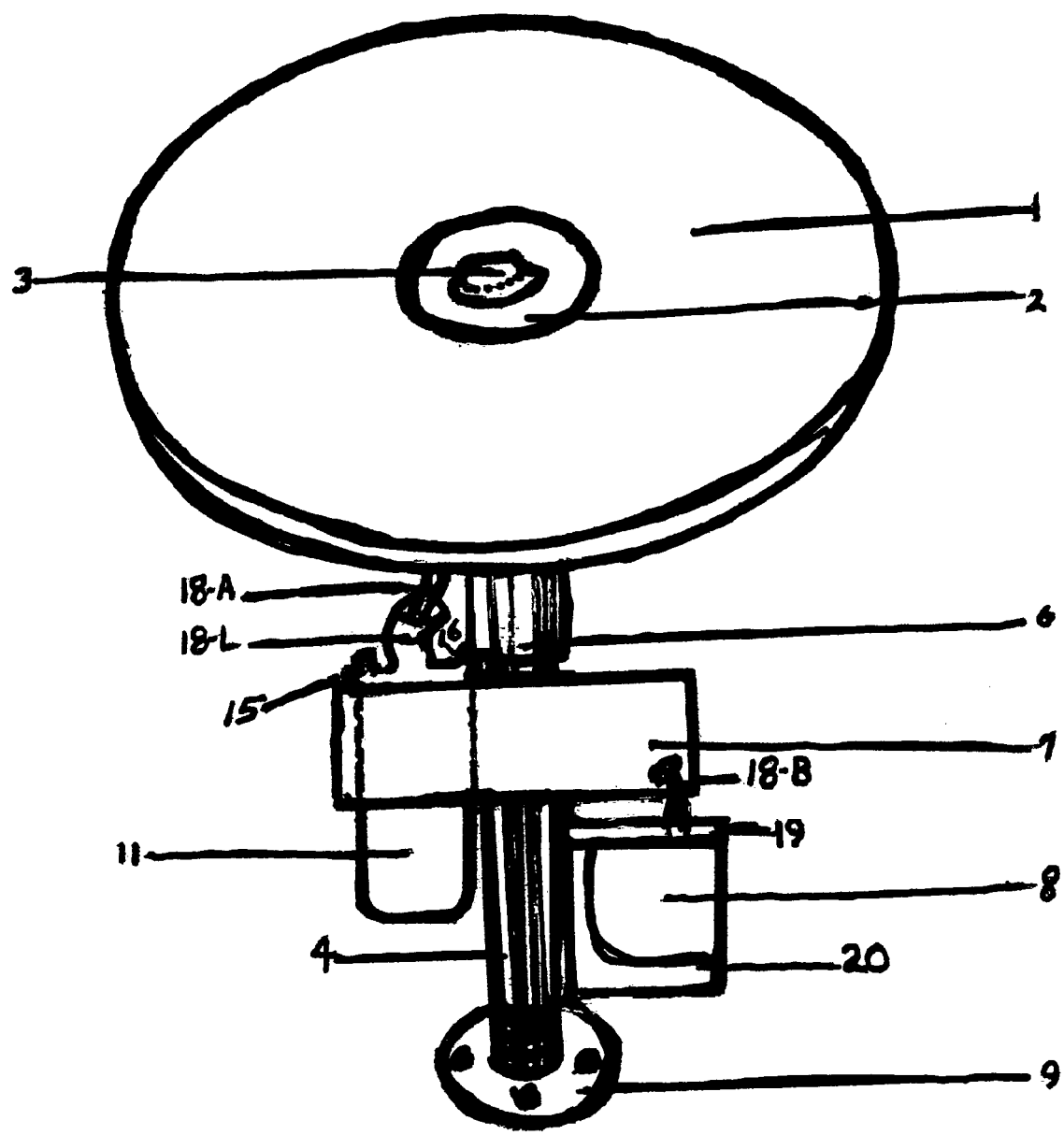
Figure 3:
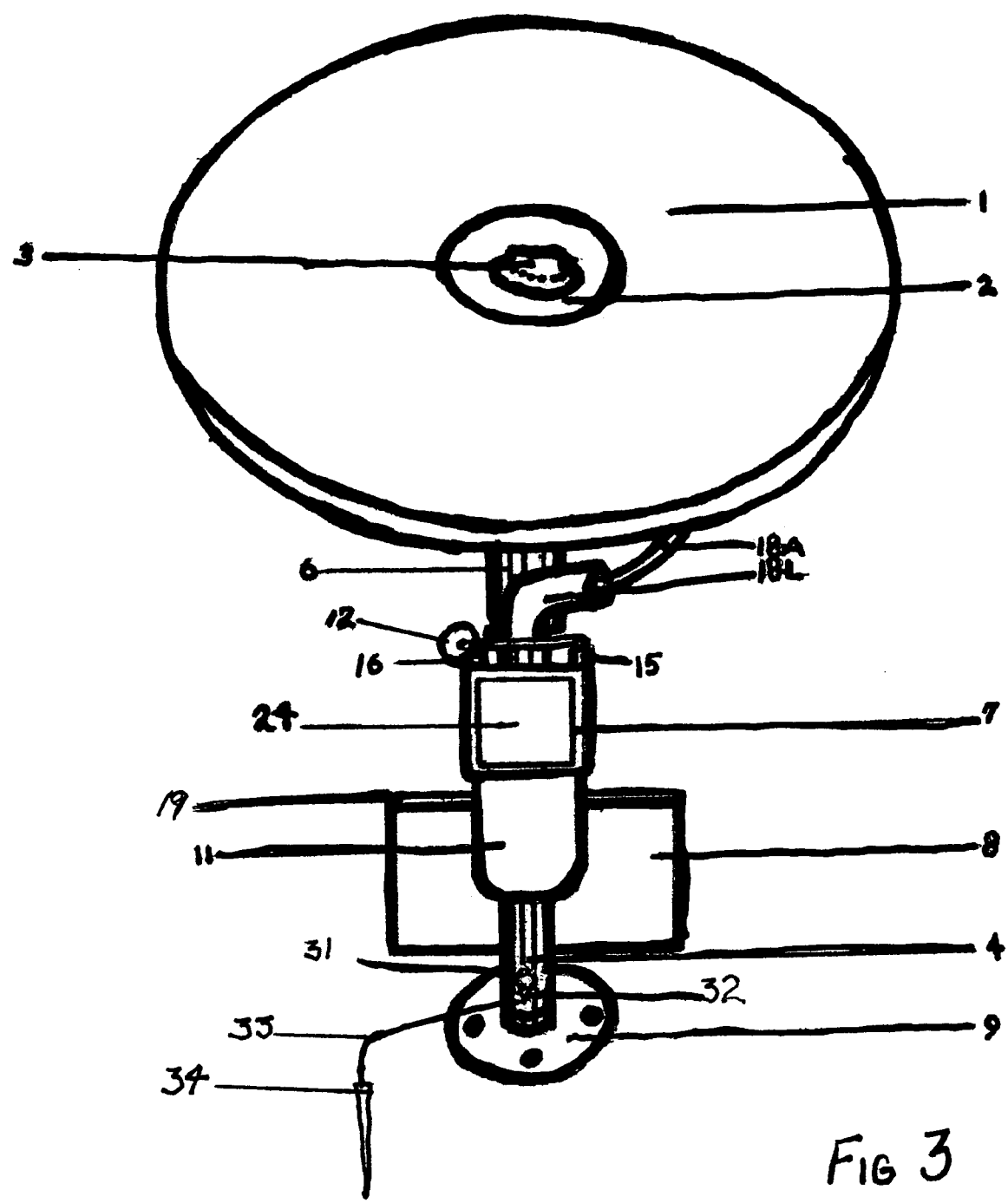
Figure 4:
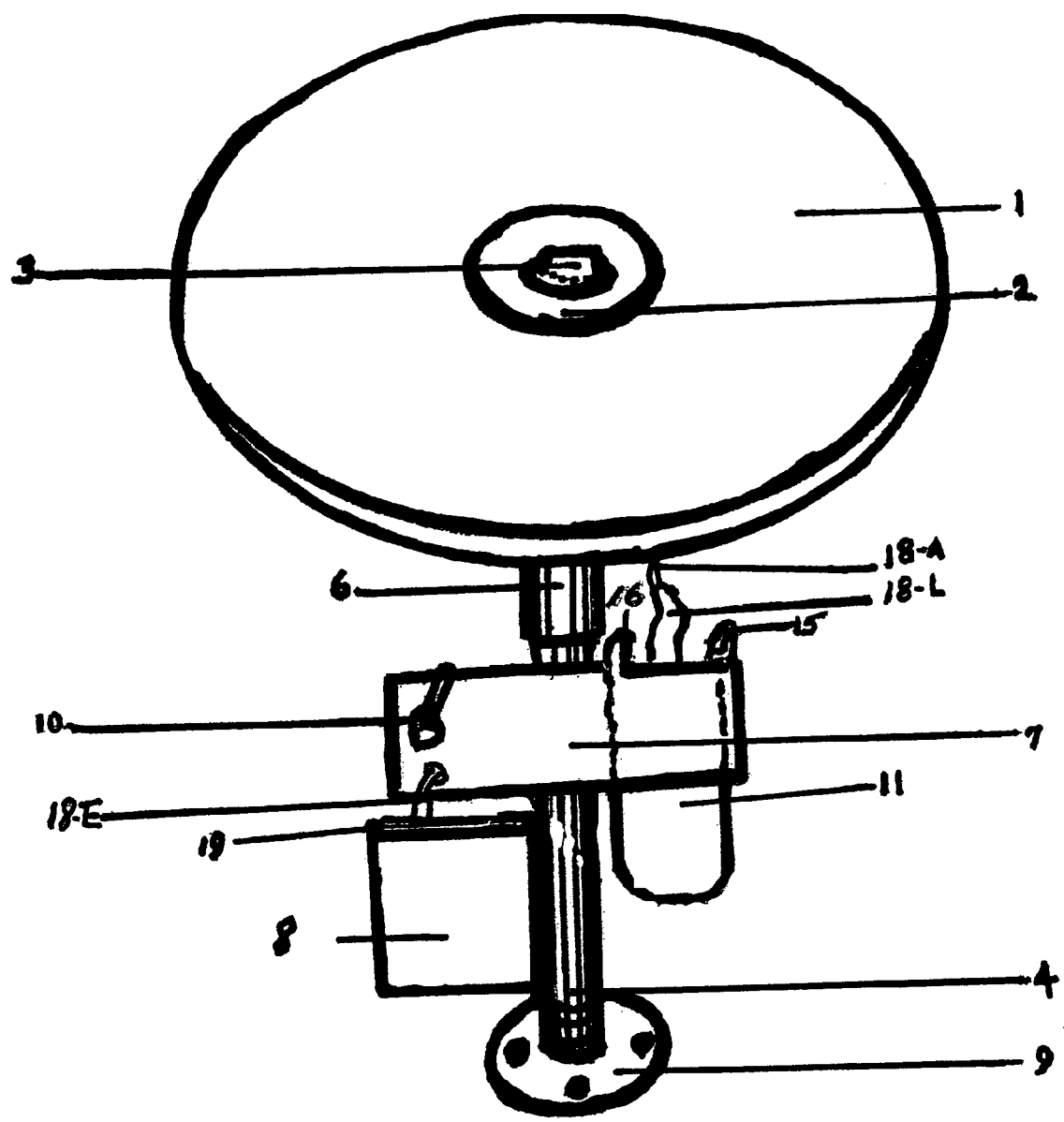
FIG. 4 is as view of the unit from its left side. The coil (11), its positive (15) and negative (16) posts, high tension wire (18-a) and boot (18-L) held by the protective housing (07) is seen as well as a view of the #1 switch (10) and the battery pack (08) beneath the Plexiglas plate (19) with the positive battery wire (18-E) heading to the #1 switch located at the front of the unit.

10. The last thing to do in the construction phase is to make a ground post (34). From FIG. 3 you can see the approximate placing for the ground post. At a point one inch above the threading at the bottom of the center pipe (03) on the back side, drill and then tap a hole to receive a ¼ inch screw that is about an inch long. Get an electrical end piece (32) to connect the wire to the screw (31), a piece of 14 gauge copper wire that is about 18 inches long (33) and a 2 foot long copper grounding post (34). Attach your electrical connection piece (32) to one end of the ground wire (33). Attach it onto your screw (31) and put screw into prepared hole on post. Get your copper grounding post (34) and attach the free end of the copper grounding wire (33) to it. When you put the unit into use, always place the grounding post into the ground nearby. It is also noted that the grounding wire can be lengthened or shortened if necessary to reach the ground for the job your are doing.

11. When an animal moves the disk (01), the rubber matting (02) reconfigures itself as seen in FIGS. 18 and 19, and the oversized washer (05) on the bottom of the disk makes contact with the copper collar (06) on the center pipe (04), and the animal receives a shock. Simply put, when the #2 switch is closed by the animal moving the disk, the battery builds ignition, produces a spark, and the animal gets shocked. More specifically, when the animal moves the disk, the points in the relay close to build up energy in the coil on the primary side which then 'gets so full' it collapses to the secondary side, the points open on the coil and send a spark through the high tension wire to the sheet metal surface and the animal who is in contact with the sheet metal surface receives the shock. Since electricity follows the path of least resistance, the condenser keeps the coil from collapsing back, and blocks the electricity from taking any path but through the high tension wire. The number one switch (10) is used to turn the unit completely off when desired, when not in use, or when servicing.

I claim:

1. A portable, animal repelling and/or restraining unit consisting of a sheet metal surface with a 100% rubber center, a relay, a condenser, a coil, and a protective housing for shielding electrical components to produce a high voltage electrical shock generated by an AC or 12 volt battery to deal with nuisance animals, and supported on a center pipe equipped with copper wire and attached to a grounding post inserted into the ground beside the unit for grounding the electrical components.

2. A device according to claim 1 equipped with an external on /off toggle switch to restrict power from the unit when necessary; and electrical circuitry for formation of an internal switch to allow power from said battery to said sheet metal surface only when said surface is moved, thereby avoiding the need for a charging unit, said circuitry making the unit silent in operation.

3. A device according to claim 2, wherein said movable sheet metal surface and rubber center are constructed in applicable shape, gauge and thickness to adapt for dealing with nuisance animals of all sizes and strengths.

4. A device according to claim 1 wherein mechanical parts are separable from said sheet metal surface for mounting to accommodate various nuisance behaviors and animals.

* * * * *